United States Patent [19]

Teeter et al.

[11] 4,117,271
[45] Sep. 26, 1978

[54] INDUCTIVE COMMUNICATION SYSTEM

[75] Inventors: Wallis L. Teeter; David J. Richter, both of Ridgecrest, Calif.

[73] Assignee: The United States of America as represented by the Secretary of the Navy, Washington, D.C.

[21] Appl. No.: 757,819

[22] Filed: Jan. 10, 1977

[51] Int. Cl.² .............................................. H04B 5/06
[52] U.S. Cl. ..................................................... 179/82
[58] Field of Search ...................... 179/82; 325/51, 53, 325/54, 65, 132; 340/38 L; 343/200

[56] References Cited

U.S. PATENT DOCUMENTS

| 2,596,013 | 5/1952 | Doriot | 179/82 |
| 2,921,141 | 1/1960 | Enikeieff | 179/82 |
| 3,803,366 | 4/1974 | Ishii | 179/82 |
| 3,978,469 | 8/1976 | Schaad | 179/82 |

Primary Examiner—Kathleen H. Claffy
Assistant Examiner—Joseph A. Popek
Attorney, Agent, or Firm—R. S. Sciascia; Roy Miller; Kenneth Pritchard

[57] ABSTRACT

An apparatus providing multiple conversations over limited range. Pseudo-noise modulations and specific address coding permit multiple conversations between a base station and several vehicles or between the vehicles. A variable power source gives even greater range control for private communication. By utilizing portable communicators, vehicles can be guided by individuals around the base station.

4 Claims, 3 Drawing Figures

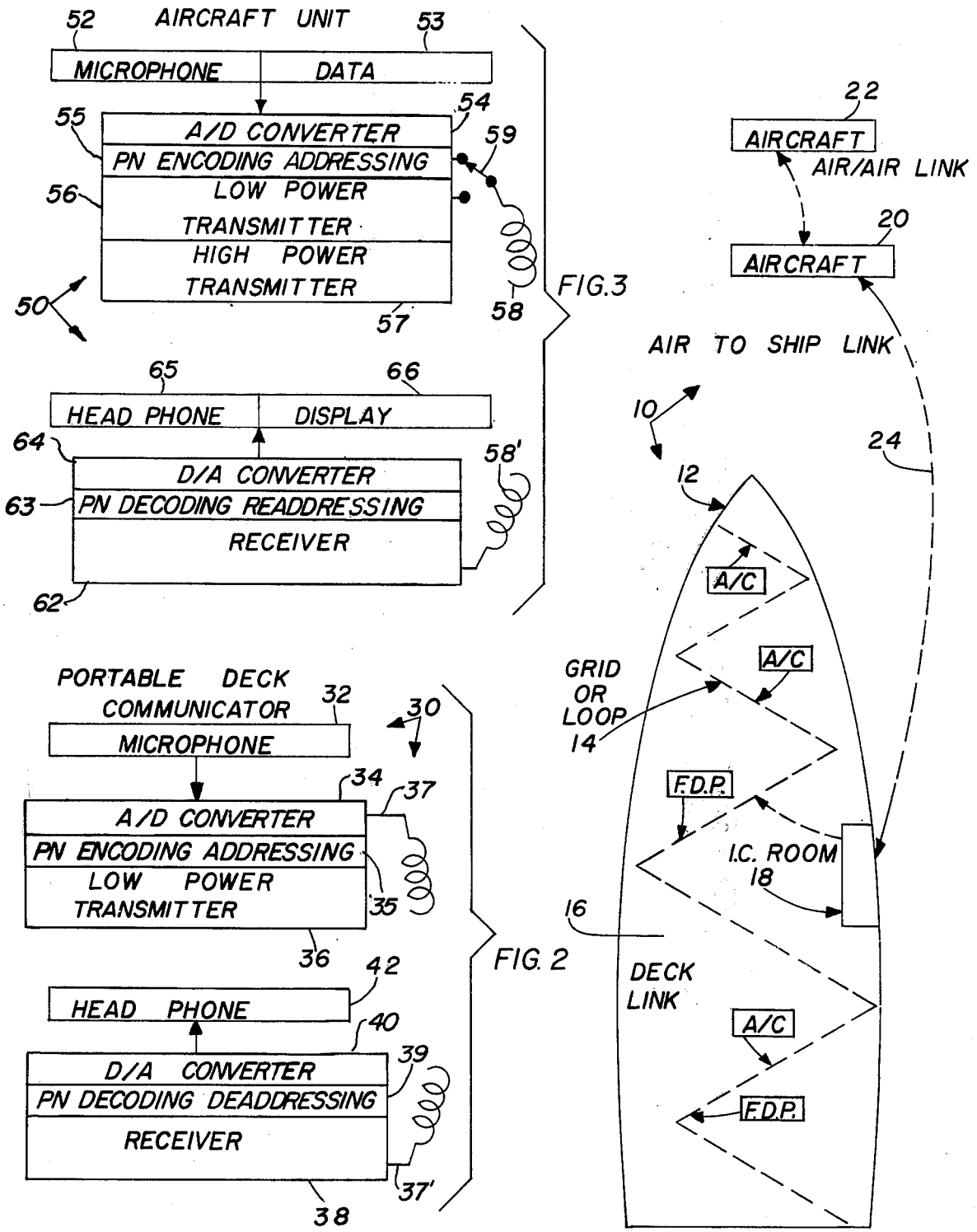

INDUCTIVE COMMUNICATION SYSTEM

FIELD OF THE INVENTION

The present invention relates to communication systems. In particular to communications systems only needing and/or desiring limited range. More particularly it relates to terminal facilities requiring multiple voice communications at any given time, such as airports, aircraft carriers, hospitals, and so forth.

Present communications in these situations are accomplished by using radiated radio frequency energy or direct wire connectors. The radio-frequency spectrum is becoming saturated with signals and a solid wire system restricts movement. Thus, alternative systems have been sought.

Inductive coupling avoids both the need for radio radiation transmission systems and the physical link of direct wire. By using pseudo-noise modulators as described in *Radar Design Principles* by Fred E. Nathanson, more than one conversation can be carried on over the same circuit avoiding the need for many frequencies.

SUMMARY OF THE INVENTION

Use of inductive coupling solves all these problems. Further, the aspects of induction which have been considered drawbacks can be used as advantageous in this area.

Radio frequency antennas have a signal strength dropoff proportional to $1/R^2$ (where R=range). This inverse square relation to distance from the source compares favorably to induction's inverse cube relation of $1/R^3$ signal strength dropoff when maximum range is desired. However, when trying to limit distance to avoid detection or overcrowding, induction's faster drop off is preferable.

If digital or pseudo-noise codes are used, additional privacy is obtained. For military environments such privacy is of great value. Further, coupling is not effected to any significant degree by background electromagnetic radiation. This enhances the reliability of the system.

The combined effect is that the transmitted information is only intelligible to coded receivers located in close proximity. The range can be controlled even further by use of a power regulation device.

The communication system utilizes inductive coupling either between wire grids or the near field loops of antennas. Voice or data signals are fed in analog wave form into a converter and the digitized output feeds the transmitter.

Multiple communications via coding is achieved by use of a pseudo-noise modulator in the circuit prior to actual transmission.

BRIEF DESCRIPTION OF DRAWINGS

FIG. 1 is a diagram of an aircraft carrier being used as a base station or terminal.

FIG. 2 is a block diagram of a portable communicator.

FIG. 3 is another version of a portable communicator.

DESCRIPTION OF THE PREFERRED EMBODIMENT (S)

The system generally indicated by the numeral 10 in FIG. 1 includes an aircraft carrier 12 which has a grid or loop 14 imbedded in the deck 16. Several aircraft (A/C) are shown spotted around the deck 16 along with a number of flight deck personnel (F.D.P.).

The aircraft and the flight deck personnel on deck 16 are indicated by the dotted lines (arrows) to be in communication with each other and with the Communications (I.C.) Room of the carrier. Also in communication with the I.C. room are two aircraft 20 and 22 as indicated by the dotted line 24. These aircraft are in flight.

Each of the F.D.P. are equipped with a small portable deck communicator generally indicated at 30 in FIG. 2. The communicator consists essentially of a microphone 32 and headset 42 connected to a miniature transmitter 36 and receiver 38 via the appropriate converters and encoders decoders 34 and 40.

For transmission, sound waves received by microphone 32 are thereby converted into an electrical analog wave form which is then transformed and encoded by converter 34 to a digital signal which feeds the transmitter 36.

Superimposed on the digital signal from converter 34 is a pseudo-noise code reference signal from pseudo-noise generator 35. Pseudo-noise generator 35 also addresses the signal. The pseudo-noise encoded and addressed signal is what is sent by transmitter 36.

Digital signals received by receiver 38 are fed into pseudo-noise decoding deaddressing unit 39 which has a selective address filter. Only a signal with an address for receiver 38 is properly decoded. Decoded signals are sent through digital to analog converter 40 for translation into sound waves by headphones 42.

Data on the aircraft unit 50 in FIG. 3 is treated the same way as in FIG. 2. Microphone 52 and data input 53 are connected to converter 54. Pseudo-noise generator 55 modulates this signal for transmittal. The aircraft unit 50 may transmit on a low power transmitter 56 or a high power transmitter 57 by alternative connection of antenna 58 by switch 59.

Aircraft unit 50 has receiver 62 feed pseudo-noise decoding deaddressing unit 63. This filters out all signals except those addressed to this unit. Properly addressed signals are passed to digital to analog converter 64 for translation into signals for voice communication by headphones 65 or signals for data display by data display unit 66.

Pseudo-noise modulation is a well known method of providing privacy in communication. In addition to the book by Nathan noted above, detailed information can be found in *Spread Spectrum Techniques* edited by Robert C. Dixon. Spread spectrum techniques have four basic types:

1. predetermined sequence modulations
2. phase modulation
3. amplitude modulation
4. frequency modulation Each of these is referred to by slightly different terms in reference works. For example, predetermined sequence modulation is also called direct sequence modulated or pseudo-noise modulated.

It is clear to those skilled in the art that the type of spread spectrum technique used is at the discretion of the user. Only pseudo-noise modulation will be described as an example.

Microphone 52 or data source 53 provide an information signal which is binary coded or digitized and has superimposed on it a pseudo-noise code reference signal from a pseudo-noise generator. The binary bits of each word are used as an address code for each transceiver This address code identifies each message sent to the particular vehicle that sent it.

At the receiver of each vehicle and the base station is a mixer which takes the received signal and removes from it the same pseudo-noise code reference signal. The address code if fed through a filter which will only pass the address code desired.

According to the present invention, the system utilizes inductive coupling concepts instead of conventional radiated energy concepts. The system will be inherently private because inductive coupling can only be effective for short ranges.

As shown in FIGS. 1, 2, & 3 each deck to aircraft induction communication system transceiver will induction couple to the loop (or grid) 14 of FIG. 1 for private transmission around the carrier deck and require only milliwatts of transmitter power. Coupling may be made to a communications room 18 which may place the conversation (or data) on the inductive coupling loop or grid for use by F. D. P.

Coupling efficiency is $= (\omega M)^2 / 4 r_1 r_2$

Where $M$ = mutual coupling between the transmitting and receiving antennas.

$r_1$ = resistance loss component of an antenna.

$r_2$ = resistance loss component of the other antenna.

$\omega$ = frequency.

If $r_1$ and $r_2$ are minimized and M maximized, efficiency will be better at higher frequencies. This is subject to the dependence of loss resistance on frequency.

With current state-of-the-art component (feramic) technology, carrier frequencies would probably be best in the tens or hundreds of KHz region, up to about a hundred megahertz or so maximum.

Common antennas are designed to minimize the near field and maximize the far field. This can be expressed in terms of antenna impedance as $Za = R + jX$ Where $Za$ = antenna impedance $R$ = radiated radio frequency energy (far field)

$jX$ = inductive field strength coupling (near field).

For inductive communication the near field should be maximized and the far field minimized.

What is claimed is:

1. A communication system between a base station and a plurality of vehicles with a transceiver at the base station and a transceiver in each vehicle comprising:

means for initiating voice or data signals within each transceiver;

an analog to digital, A/D, converter within each transceiver connected to the output of said voice or data signal initiating means for converting said signals to digital form;

means for address encoding within each transceiver connected to said A/D converters for encoding said digital signals as pseudo-noise;

a transmitter connected to the output of said A/D converter for transmitting said pseudo-noise encoded digital signals;

a receiver within each transceiver for receiving pseudo-noise encoded digital transmissions;

means for address decoding said pseudo-noise encoded digital transmissions into digital signals connected to the output of said receiver within each transceiver;

a digital to analog, D/A, converter connected to the output of said address decoding means within each transceiver for converting said digital signals to analog signals; means connected to the output of said D/A converter for displaying data signals received from a transceiver; and loop means for inductively coupling said transceivers so as to be capable of two-way voice communication transmissions with said plurality of vehicles and said base station.

2. A communications system as described in claim 1 wherein the means for initiating voice transmission is a microphone.

3. A communication system as described in claim 1 wherein the display means is a cathode ray tube display.

4. A communication system as described in claim 1 wherein the display means is a digital display.

* * * * *